United States Patent [19]
Mendenhall et al.

[11] Patent Number: 6,077,876
[45] Date of Patent: *Jun. 20, 2000

[54] PROCESS FOR HIGH TEMPERATURE PRODUCTION OF ORGANIC AEROGELS

[75] Inventors: Robert S. Mendenhall; Greg R. Andrews, both of Lawrenceville, Ga.; Joseph W. Bruno; Donald F. Albert, both of Higganum, Conn.

[73] Assignee: General Ideas, Inc., Lawrenceville, Ga.

[*] Notice: This patent is subject to a terminal disclaimer.

[21] Appl. No.: 09/389,930

[22] Filed: Sep. 3, 1999

Related U.S. Application Data

[63] Continuation-in-part of application No. 09/221,520, Dec. 28, 1998.
[60] Provisional application No. 60/068,861, Dec. 29, 1997.

[51] Int. Cl.[7] .................................................. C08J 9/28
[52] U.S. Cl. ................................. 521/64; 521/181
[58] Field of Search ............................ 521/64, 181

[56] References Cited

U.S. PATENT DOCUMENTS

| | | | |
|---|---|---|---|
| 2,249,767 | 7/1941 | Kistler et al. | 252/273 |
| 3,672,833 | 6/1972 | Teichner et al. | 23/182 R |
| 4,327,065 | 4/1982 | von Dardel et al. | 423/338 |
| 4,402,927 | 9/1983 | von Dardel et al. | 423/335 |
| 4,432,956 | 2/1984 | Zaraycki et al. | 423/338 |
| 4,610,863 | 9/1986 | Tewari et al. | 423/338 |
| 4,806,328 | 2/1989 | van Lierop et al. | 423/338 |
| 4,873,218 | 10/1989 | Pekala | 423/338 |
| 4,997,804 | 3/1991 | Pekala | 502/418 |
| 5,081,163 | 1/1992 | Pekala | 521/187 |
| 5,086,085 | 2/1992 | Pekala | 521/187 |
| 5,128,382 | 7/1992 | Elliot, Jr. et al. | 521/178 |
| 5,252,620 | 10/1993 | Elliot, Jr. et al. | 521/149 |
| 5,260,855 | 11/1993 | Kaschmitter et al. | 361/502 |
| 5,275,796 | 1/1994 | Tillotson et al. | 423/338 |
| 5,420,168 | 5/1995 | Mayer et al. | 521/99 |
| 5,476,878 | 12/1995 | Pekala | 521/61 |
| 5,484,818 | 1/1996 | De Vos et al. | 521/123 |
| 5,556,892 | 9/1996 | Pekala | 521/181 |
| 5,601,938 | 2/1997 | Mayer et al. | 429/40 |
| 5,686,031 | 11/1997 | Coronado et al. | 264/40.1 |
| 5,698,140 | 12/1997 | Lamb et al. | 252/502 |
| 5,744,510 | 4/1998 | Pekala | 521/181 |

OTHER PUBLICATIONS

Bommel and Haan: "Drying of silica gels with supercritical carbon dioxide," *Journal of Materials Science*, vol. 29, (1994) p. 943.

Poco, et. al.: "A rapid supercritical extraction process for the production of silica aerogels," *Materials Research Society Symposium Proceedings*, vol. 431, 1996.

Ebert, et. al: "The hot–wire method applied to porous materials of low thermal conductivity," *High Temperature—High Pressure*, vol. 25, (1993) p. 391.

*Primary Examiner*—Morton Foelak
*Attorney, Agent, or Firm*—Barry E. Kaplan, Esq.; Hughes & Kaplan

[57] ABSTRACT

Disclosed is a process for the production of organic aerogels, whereby the organic solvent in which the gel is immersed is directly extracted supercritically without the need for exchange with a low temperature solvent (i.e., $CO_2$) prior to extraction of the pore fluid.

23 Claims, No Drawings

PROCESS FOR HIGH TEMPERATURE PRODUCTION OF ORGANIC AEROGELS

RELATED APPLICATIONS

This is a continuation-in-part of a patent application of same title and having Ser. No. 09/221,520 filed Dec. 28, 1998, now allowed, which patent application resulted from provisional patent application Ser. No. 60/068,861 filed Dec. 29, 1997.

FIELD OF INVENTION

The present invention relates, generally, to a process for production of organic aerogel materials, and more specifically, to a novel and more efficient process for forming organic aerogels in the form of crack-free monoliths.

BACKGROUND OF THE INVENTION

Aerogels are a unique class of ultra fine pore size, low density, high surface area, open-cell foams. Although many well-known methods of aerogel production are quite elaborate, in essence two fundamental steps are required. In the first step, precursor chemicals are added to a liquid solvent where they react to form a 'gel,' which consists of a continuous, three-dimensional framework extending throughout the liquid solvent. In the second step, the solvent must be removed and replaced by air, leaving the dry solid framework, known as an aerogel. The second step is especially tricky because the force of the surface tension of the liquid solvent exceeds the strength of the tiny aerogel pores; therefore, if the solvent is removed by conventional techniques, the pores will be collapsed, destroying the desired aerogel product. Although aerogel pieces of extremely thin cross section have been made using evaporative methods of solvent removal, such methods cannot, to date, be used to obtain pieces greater than about 0.050 inch in thickness. See U.S. Pat. No. 5,420,168 issued May 30, 1995 to Mayer et al.

Through the manipulation of pressure and temperature, compounds can be transformed into 'supercritical fluids', which, among other interesting properties, have no surface tension. Relating this phenomena to aerogel production involves maintaining submersion of the solid framework until the liquid which fills the tiny pores is converted to a supercritical fluid, which is then extracted while in the supercritical state, thereby yielding an undamaged product.

There are many known methods of aerogel production; and, for the purposes of the present discussion, they may be divided into two method types. According to the first method, the precursor chemicals are mixed with a solvent, a gel forms and is brought to conditions where the pore liquid becomes supercritical, and then solvent extraction is carried out. According to the second method, the solvent in which the gel is formed is replaced with another solvent, which typically is not suitable to salvation of the precursor chemicals, but which has a supercritical temperature that is much lower than that of the original solvent.

In some cases, solvent exchange is performed because bringing the gel to conditions where the solvent becomes a supercritical fluid will damage the product, and the solvent must, therefore, first be replaced with a solvent which can be made supercritical without causing damage to the gel. In other cases, the original solvent could be supercritically extracted without damage to the gel, but the lower temperature extraction is more conducive to producing particular properties desired in the finished aerogel. In yet other cases, the original solvent is exchanged because the lower temperature needed to extract the final solvent is felt to be more desirable from a production standpoint, even though the solvent exchange step is very time consuming.

Bommel and Haan, in "Drying of Silica Gels with Supercritical Carbon Dioxide," *J.Mater. Sci.* 29 (1994) 943, report results of exchanging an alcohol solvent in a pilot carbon dioxide extraction apparatus. They found that the time required for exchanging ethanol with $CO_2$ increases exponentially with gel thickness, and estimate that gels in the form of plates would require 1.5 hours for a 1 cm thick gel, 7 hours for a 2 cm thick gel, and 14 hours for a 3 cm thick gel.

U.S. Pat. No. 2,249,767, issued Jul. 22, 1941 to Kistler, describes the formation of silica-based gels by the reaction of sodium silicate and sulfuric acid in aqueous solution. After formation, the gel is washed to remove salts and excess acid and is placed in an autoclave, where the water is exchanged with alcohol. The alcohol is then supercritically extracted. The water is exchanged with alcohol because supercritical water will begin to re-dissolve the solid framework of the gel.

U.S. Pat. No. 3,672,833, issued Jun. 27, 1972 to Teichner et al., describes production of silica aerogel prepared by hydrolysis of either methyl or ethyl orthosilicate in alcohol; thereby, eliminating both the gel washing and solvent exchange steps. The alcohol-plus-water pore liquid was extracted supercritically at about 275° C. without solvent exchange, but the product was limited to granular material, which was acceptable for its intended applications.

U.S. Pat. No. 4,327,065, issued Apr. 27, 1982, and U.S. Pat. No. 4,402,927, issued Sep. 6, 1983, both to von Dardel et al., teach a method of forming transparent silica aerogel monoliths. The described method requires that the gel be washed repeatedly with pure alcohol to remove the water portion of the alcohol and water pore liquid prior to supercritical extraction. After the gel is formed and washed, it is placed in an autoclave, where final treatment and extraction require at least 24 hours.

U.S. Pat. No. 4,432,956, issued Feb. 21, 1984, to Zarzycki et al. describes a process similar to above referenced Pat. No. 4,402,927, except the gels are not washed and much faster heating and venting of the autoclave is employed. Only relatively dense aerogels, however, could be produced by this method.

U.S. Pat. No. 4,610,863, issued Sep. 9, 1986 to Tewari et al., teaches the method of silica aerogel production that utilizes carbon dioxide as the extraction solvent.

U.S. Pat. No. 4,806,328, issued Feb. 21, 1989 to van Lierop et al., reports improved results relative to above referenced Pat. No. 4,432,956 by pre-pressurizing the autoclave to at least 50 bar prior to heating. This process also was able to produce fairly low-density aerogels.

U.S. Pat. Nos. 4,873,218, issued Oct. 10, 1989, and 4,997,804, issued Mar. 5, 1991, both to R. W. Pekala, describe some of the advantages and applications of organic aerogels, as well as teaching a method for producing a resorcinol-formaldehyde aerogel. As discussed in the patents, organic aerogels have distinct advantages over inorganic aerogels for many applications. U.S. Pat. Nos. 5,081,163, issued Jan. 14, 1992, and 5,086,085, issued Feb. 4, 1992, both also to R. W. Pekala, describe further applications of organic aerogels and teach preparation of transparent melamine-formaldehyde aerogels. The procedures described in the above four patents involve adding the precursor chemicals, plus a small amount of catalyst, to water in which the gel forms. The water is then exchanged with an organic solvent that is compatible with carbon dioxide. The organic solvent is then exchanged with liquid $CO_2$, which is extracted somewhere above the relatively low (31° C.) supercritical temperature of the $CO_2$. The descriptions provided in the above patents illustrate the tedious and time-consuming nature of the solvent exchange steps.

U.S. Pat. Nos. 5,128,382, issued Jul. 7, 1992, and 5,252,620, issued Oct. 12, 1993, both to Elliott, Jr. et al., describe the formation of epoxy-based and methacrylate-based copolymer microcellular foams. The foam precursor chemicals were polymerized in either propane or freon-22 solvents, which were then supercritically extracted at about 100° C. Several other solvents are listed which could be used, and it is noted that, "almost any solvent with a relatively low critical temperature (<200° C.) is a candidate." This patent also states without further elaboration that, "previous attempts to apply a similar process to resorcinol-formaldehyde aerogels resulted in substantial changes to the polymer product."

U.S. Pat. No. 5,275,796, issued Jan. 4, 1994 to Tillotson et al., describes a process for making silica aerogel monoliths that requires the preparation of a 'condensed silica intermediate,' which becomes the precursor for a gel in which the primarily acetonitrile solvent is directly extracted supercritically at about 300° C. and 2000 psig. The high temperatures and pressures produce an aerogel with a hydrophobic character which will hold up well when exposed to humidity, as opposed to silica aerogels produced by low temperature (i.e., $CO_2$) extraction which have a hydrophilic character.

U.S. Pat. No. 5,484,818, issued Jan. 16, 1996 to De Vos et al., describes a variety of polyisocyanate-based organic aerogels, some of which were formed directly in solvents that were then extracted without solvent exchange.

U.S. Pat. Nos. 5,476,878, issued Dec. 19, 1995, 5,556,892, issued Sep. 17, 1996, and 5,744,510, issued Apr. 28, 1998, all to R. W. Pekala, describe further advantages and uses of organic aerogels, as well as teach the formation of a phenolic-furfural aerogel which has two distinct advantages over prior organic aerogels. First, the precursor chemicals are substantially less expensive than those used to produce prior-art organic aerogels. Second, phenolic-furfural gels are formed directly in an organic solvent that is compatible with carbon dioxide, thereby eliminating the tedious aqueous-to-organic solvent exchange. The solvents used were n-propanol and isopropanol, and it was noted that different solvents, such as ethanol or methanol, could also be used. The process described in these patents represents a significant improvement over the prior-art by eliminating the aqueous-to-organic solvent exchange step; however, the gel still must be flushed repeatedly with liquid $CO_2$ to completely replace all of the organic solvent prior to supercritical extraction.

U.S. Pat. No. 5,686,031, issued Nov. 11, 1997 to Coronado et al., teaches a novel, highly efficient process for rapidly producing microporous materials, including aerogels. Prior to this process, the typical method for making aerogels consisted of forming gels in some sort of open mold, placing the mold in an autoclave, performing a solvent exchange if necessary, increasing the temperature and pressure to make the solvent supercritical, then venting the autoclave. As explained in the patent, a primary drawback of the autoclave method is that the rate of heating and venting must be very slow to avoid internal stresses and cracking of the gel. Because the pore size is so tiny, unless heating occurs very slowly, the liquid solvent within the gel expands faster than the solvent can flow through the pore matrix. The process described in the patent involves completely filling a closed metal mold with gel precursors, then heating rapidly, causing the internal temperature and pressure to rise above the critical points of the solvent. The gel's total confinement within a closed mold limits internal stresses, which allows the gel to be heated and vented extremely rapidly compared to autoclave processes. The patent reports that heating from room temperature to 300° C. requires only about 15 minutes, and that venting from 200 bars to 2 bars also requires only about 15 minutes. The patent further reports that high temperature and pressure accelerate gel formation so extensively that silica gels are fully formed in the 15 minutes required for heating, which allows venting to begin as soon as supercritical conditions are reached. As stated in the patent, "[t]he present method allows rapid, semi-continuous processing of ultra fine pore materials for mass production, thereby making the manufacture of these types of materials cost-effective." Clearly, with the availability of this process, it is advantageous to eliminate the solvent exchange step whenever possible, unless it is absolutely necessary for production of a certain type of aerogel.

The above process, and the apparatus required to apply it, are also described by Poco et al., "A Rapid Supercritical Extraction Process for the Production of Silica Aerogels," Mat. Res. Soc. Symp. Proc., Vol. 431, 1996, 297–302. This article adopts the useful acronym, 'RSCE,' standing for 'Rapid SuperCritical Extraction,' and reports that, "the RSCE process can produce aerogels, from start-to-finish, 30 times faster than existing supercritical drying processes because the gel forms during the process and the liquids can be rapidly purged from the confined gel without cracking it."

Prior art organic aerogels have been shown to have numerous advantages and widespread potential applications. (For just a few examples of their potential, see U.S. Pat. Nos. 5,260,855, 5,601,938, and 5,698,140.) However, more rapid processing methods are needed in order that their manufacture be practicable for anything other than the most esoteric of applications. The present invention teaches methods by which mass-manufacture of organic aerogels becomes economically sensible.

SUMMARY OF THE INVENTION

The object of the present invention is to provide a much faster process for producing organic aerogels. By this process, organic aerogels are produced without the necessity of an unavoidably lengthy solvent exchange step. By previous methods, supercritical solvent extraction cannot occur until all of the pore liquid of the gel is replaced with liquid carbon dioxide, which has a supercritical temperature of 31° C. The present method allows for direct supercritical extraction of the solvent in which the organic gel is formed, even though this must occur at temperatures of 200 to 300° C. By eliminating the necessity of a solvent exchange step, it is practicable to produce organic aerogels by the above-referenced RSCE process, and, thereby, achieve the rapid production rates necessary for large-scale manufacture of organic aerogel monoliths.

In the general process of the present invention, and utilizing a phenolic-furfural organic aerogel as an exemplary formulation, various solvents, including methanol, ethanol, n-propanol and isopropyl alcohol, may be used to solvate FurCarb UP520 resin and QUACORR 2001 catalyst, both made by QO Chemicals, Inc. (West Lafayette, Ind.). The solution is aged in accordance with the techniques described hereinbelow, and a closed mold is filled with the solution. Heat is applied until the solution achieves supercritical temperatures of between about 200 and 300° C., and pressures of between about 900 and 2,500 psig. The mold is then vented to approximately 50 psig, and then purged with nitrogen gas. The apparatus is allowed to cool to desired process handling temperatures and the aerogel monolith is then demolded.

As an alternative to the above-described full-mold process, the mold may be only partially filled. It has been found that if the mold is filled to less than approximately seventy percent (70%) capacity, the need to vent overpressurization conditions prior to reaching supercritical temperatures is avoided.

Another alternative process is to add the solution to an open mold, which is then contained within a pressure-vessel that can be heated and pressurized to obtain supercritical conditions for the solution.

DETAILED DESCRIPTION OF THE PREFERRED EMBODIMENT OF THE INVENTION

In describing the preferred embodiment of the present invention, specific terminology is employed for the sake of clarity. The invention, however, is not intended to be limited to the specific terminology so selected, and it is to be understood that each specific element and step includes all technical equivalents that operate in a similar manner to accomplish a similar purpose. It will be appreciated that the process of the present invention may be varied as to configuration, and with regard to details of the steps presented and the materials employed, without departing from the scope of the basic invention as disclosed herein.

The present invention is directed to the production of organic aerogels; and, more specifically, to a process which eliminates the organic solvent to carbon dioxide exchange step. Since extraction occurs in organic solvent (i.e., alcohol) rather than $CO_2$, this process takes place at much higher temperatures than do those of prior-art methods. Gelation also occurs at highly increased rates relative to prior-art methods, due to the much higher temperatures and pressures at which gel formation occurs with the present process. Because the gels are contained within a mold, it is possible to heat more rapidly to above the supercritical temperature, and subsequently to vent more rapidly, than has been established by prior-art methods. It has been found that aerogels produced by the present method are monolithic, strong, uncracked, and the pore structure is undamaged.

In accordance with the preferred method of the present invention, organic aerogels may be produced by the above-referenced RSCE method, thereby multiplying production potential many times relative to methods of the prior-art. Optionally, and according to the preferred method, increased temperatures and pressures are utilized to increase the rate of gel formation. During or after gel formation, the mold is heated until supercritical conditions are obtained, then the mold is vented.

To produce aerogels such as resorcinol-formaldehyde or melamine-formaldehyde (which gels must form in aqueous solutions), the aerogel-precursor solution is added to the mold, which may optionally be heated to speed gel formation, after which the aqueous-to-organic solvent exchange occurs while the mold remains closed. Elevated pressures may be used to allow the solvent exchange to occur at temperatures above the atmospheric-pressure boiling point of the solvents. Once the water is replaced to the extent deemed necessary, the gel is brought to supercritical conditions and vented. By this method, resorcinol-formaldehyde or melamine-formaldehyde aerogels may be produced many times faster than prior-art methods, even though one solvent exchange must still occur. Temperature, pressure, and gel containment allow much higher rates of gel formation, solvent exchange, and extraction.

To produce aerogels, such as phenolic-furfural, where the gels are formed directly in organic solvents, the fundamental process is quite simple. The precursor-chemical solution is added to the mold, the mold is heated to obtain supercritical conditions, then the mold is vented.

Since any of a variety of organic aerogels may be produced by this method, the mold may be heated, and the pressures may be held, at such rates and levels as are commensurate with the parameters involved with gel formation. Such parameters are well-known in the art. For example, the mold may be heated at a very slow, continuous rate, perhaps two hours or more from room temperature up to the point where the solvent becomes supercritical, then vented. The slow rate of heating allows ample time for full gelation, and is compatible with simpler systems that may not have the capability of supplying rapid rates of heating. Alternatively, the mold may be heated very rapidly to a plateau temperature, where it remains until the gel is fully formed, then heated further to obtain supercritical conditions before venting the mold. Preferably, and to achieve the fastest production-cycle times, the mold is heated rapidly and continuously to above supercritical conditions, then vented. In order to achieve the highest possible levels of productivity, it must, therefore, be assured that gelation will occur very rapidly. To be specific, the gel must be fully formed prior to venting the mold.

In a production environment, it will be possible to heat the mold very quickly, so rapid gel formation is vital towards attaining economy of manufacture. In other words, given industrial-scale production equipment, time required for gel formation is likely to be the 'bottleneck' that limits the rate of aerogel formation. Two well-known routes to faster gelation rates are to add more catalyst or make denser aerogels. There are limits, however, to what can be achieved by adjusting these two parameters. More catalyst will speed gel formation, but above a certain level, the physical properties of the aerogel are degraded. As to density, the most useful aerogels are often the lightest, and it also should not be forgotten that a doubling of product density also doubles the cost of chemicals. Clearly, then, catalyst ratios and product densities are critical considerations when seeking to mass-produce organic aerogels. There is, however, another useful technique for achieving rapid gelation. If the aerogel precursor solution (solvent, precursor chemicals, and catalyst) is sufficiently 'aged' prior to being added to the mold, gelation will occur quickly enough to allow quite rapid rates of heating.

For aerogels of a typical density (about 100 mg/cc), the precursor solution is very dilute; e.g., the solvent comprises between 80 to 95 weight percent, or more, of the solution. For this reason, cross-linking of precursor chemicals can occur before the solution becomes very viscous. In other words, gel formation begins as soon as the catalyst is added, but the reaction tends to proceed slowly during the transition between liquid and gel. This is particularly true when producing very low-density aerogels.

An example of precursor solution aging is to allow the solution to remain for a few days at room temperature and pressure. The solution will become noticeably more viscous, but not so viscous that it cannot easily be added to the mold. Another example of aging the precursor solution would be to let the solution remain for a few hours at about 70° C. and atmospheric pressure.

A preferred method for aging the precursor solution that is compatible with industrial environments, however, is to allow the solution to remain at elevated temperatures and pressures (e.g., about 200° C. and 1,000 psig) for between 15 to 30 minutes. For mass-production, the precursor solution can be aged in large, heated, pressurized holding-vessels, then pumped or otherwise made to flow into molds of much smaller volume for final processing. In this way, one holding-vessel can supply many molds, and the molds are cycled rapidly and not tied up any longer than necessary forming the finished aerogel product. Ideally, therefore, the precursor solution should be aged in the holding-vessel to the point where it is just about to become too viscous to flow easily, then added to the mold.

It will be appreciated that the times and conditions referenced within the above discussion of solution aging are given strictly as examples. There are many factors that will determine how long, and under what conditions, a given solution should be aged. These include the type of aerogel which is selected to be produced, the density of the desired aerogel, and the type and amount of catalyst to be added. It may never be possible to achieve rapid production for some precursor solutions, particularly those designed to produce aerogels of extremely low density; whereas other solutions may not require any aging at all.

To produce aerogels where solution aging is undesirable, such as extremely fast-gelling aerogels, the above-discussed holding-vessel technique may still be utilized simply as a means of facilitating production, and not as a solution-aging vessel. In these cases, the catalyst may be introduced and mixed with the other precursor chemicals at some point between the holding-vessel and the mold.

In the preferred embodiment of this invention, the mold is completely filled with a precursor solution of the type set forth hereinbelow as an exemplary formulation. In this way, potentially troublesome vapor pockets are minimized, and the maximum volume of the mold is utilized to produce the desired product. When the mold is completely filled (i.e., the liquid chemicals are fully contained by the mold), the maximum rate of pressure increase upon heating may be achieved due to the relative incompressibility of the liquids. These and other advantages of the 'full mold' technique are discussed in the above-referenced U.S. Pat. No. 5,686,031 and the above-referenced RSCE paper.

As an alternative to using a completely filled mold, however, our tests have shown that organic aerogels can be produced at relatively high temperatures (e.g., 250° C.), even when the mold is only partially filled. In these cases, it is advisable that the mold be pre-pressurized with an inert gas prior to heating, in order to prevent boiling of the solution.

It has been found that above approximately 150° C., the dried aerogels can burn in the presence of oxygen. At the temperatures to be utilized in the preferred process of this invention, then, it is vital that organic aerogels be protected from contact with oxygen-containing gases, such as air. For this reason, it is important to ensure that all air be displaced from the mold, valves, and fittings which contact the finished aerogel. If the mold is only partially filled with precursor solution, it is possible to flush the air space with inert gas prior to heating the mold. For the preferred full-mold method, however, the system must either be designed so that the precursor chemicals displace all air, or so that the mold and all ancillary valves and fittings may be flushed with inert gas prior to filling and heating the mold.

Similarly, precautions must be taken if the finished aerogel is to be removed from the mold prior to the time necessary for sufficient cooling to occur. Since aerogels exhibit such low rates of thermal transport, it can take quite some time for the center of a large monolith to cool from perhaps 275° C. down to 150° C. While in a research environment, the simplest approach is to simply wait for the aerogel to cool sufficiently before opening the mold, in an industrial environment it is preferable to provide an inert atmosphere into which the finished aerogel is de-molded. Given the requirements of mass production, it is preferable that the mold be maintained in an inert environment at all stages of the production cycle. To accomplish this, the mold could be operated inside an enclosure in which most of the air has been either evacuated or replaced with an inert gas.

Furthermore, in order to achieve rapid cycle times of mold heating and cooling, it is preferable that the mold not be cooled to ambient temperatures. Following the venting of solvent at supercritical conditions, the mold should be cooled at most 50° C. or so below the temperature at which venting occurs. In this case, chemicals at elevated temperature and pressure are flowing into a hot pre-pressurized mold. Additional advantages of an inert production environment, then, are that the finished product is protected from oxidation upon de-molding, and the inert environment tends to guard against the potential for fire and explosion which is associated with the combination of organic solvent vapors and oxygen.

In the following examples, we will discuss the formation, in accordance with the preferred method of the present invention, of phenolic-based aerogels; that is, aerogels based upon the class of organic chemicals known as phenols. More specifically, the preferred embodiment is hereinbelow illustrated by reference to phenolic-furfural aerogels having a density of approximately 100 mg/cc. It will be appreciated by those ordinarily skilled in the art, however, that the choice of materials, solvents, densities, and the like, hereinbelow illustrated is merely exemplary and is non-limiting with respect to the invention claimed. As an additional resource, the reader's attention is again drawn to the formation of phenolic-furfural in accordance with U.S. Pat. No. 5,556,892 to Pekala.

In the general process of the present invention, various solvents, including methanol, ethanol, n-propanol and iso-propyl alcohol, may used to solvate FurCarb UP520 resin and QUACORR 2001 catalyst, both made by QO Chemicals, Inc. (West Lafayette, Ind.). The solution may be aged at ambient conditions for about a day, or, alternatively, aged in accordance with the accelerated aging techniques described hereinabove. Nitrogen gas is utilized to form an inert, pressurized environment. The solution is injected through a port in the pre-heated, pre-pressurized mold. Preferably, the mold is filled to capacity. Heat is applied until the solution achieves supercritical temperatures of between about 200 and 300° C., and pressures of between about 900 and 2,500 psig. The mold is then vented to approximately 50 psig, and then purged with nitrogen gas. The apparatus is allowed to cool to the desired process handling temperatures and the aerogel monolith is then demolded. It is noted that any of a variety of bonded teflon coatings may be utilized within the mold cavity to aid the demolding process.

As an alternative to the above-described full-mold process, the mold may be filled to approximately seventy percent (70%) capacity. This capacity is found to be appropriate to avoid the need to vent over-pressurization conditions prior to reaching supercritical temperatures.

It is observed that phenolic-furfural aerogels so produced are subject to slight shrinkage. It is also noted that when using isopropyl alcohol as the solvent, the alcohol will begin to convert, in a dehydration reaction promoted by high temperatures and acid catalyst, to ether and water.

It will be apparent to one ordinarily skilled in the art that cycle times attendant to the production of organic aerogels in accordance with the preferred method may be optimized by varying parameters such as initial catalyst concentration, precursor aging, mold heating and pressurization curves, venting cycles, and the like.

The following example provides a step-by-step operational sequence for the production of a phenolic-based aerogel monolith panel by the process of high-temperature, direct organic solvent extraction.

EXAMPLE

A typical precursor solution for production of phenolic-furfural aerogel of about 100 mg/cc density may be formulated with approximately 13 weight percent of UP520 resin, plus approximately 1.5 weight percent of Q2001 catalyst, dissolved in approximately 86 weight percent methanol. After aging the solution, the assembled mold is flushed with nitrogen gas. The precursor solution is poured through a port into the mold, with care being taken to eliminate vapor pockets. The mold is then heated at a steady rate that will raise the temperature inside the cavity from 20° C. to 250° C. in about 40 minutes. It is noted that, depending upon the nature of the equipment utilized and rate of heating, the temperature inside the cavity will lag behind the temperature measured at the mold surface. The pressure inside the mold will begin to build rapidly above about 50° C. internal temperature, and once 1,800 psig is reached, that pressure is maintained until final venting. At about 250° C., the mold is vented to below about 20 psig, where it is held until the aerogel is cooled to demolding temperatures which are appropriate to the equipment and environment being utilized.

While particular operational sequences, formulations, materials, process parameters, equipment, and end products have been set forth to describe and exemplify this invention, such are not intended to be limiting. Rather, it should be noted by those ordinarily skilled in the art that the within disclosures are exemplary only and that various other alternatives, adaptations, and modifications may be made within the scope of the present invention. Accordingly, the present invention is not limited to the specific embodiments illustrated herein, but is limited only by the following claims.

Having thus described exemplary embodiments of the present invention,

We claim:

1. A process for producing organic aerogels, said process comprising the steps of:
 (a.) forming a solution comprising a predetermined amount of organic aerogel precursor chemicals, a predetermined amount of polymerization promoting catalyst, and an organic solvent;
 (b.) adding said solution to a mold;
 (c.) holding said mold containing said solution within a closed vessel;
 (d.) optionally heating and pressurizing said vessel sufficiently to cause said solution to form a stable gel;
 (e.) heating and pressurizing said vessel to the point where said organic solvent of said solution is near to, at, or above supercritical conditions; and,
 (f.) venting said vessel to extract said organic solvent from the pores of said gel.

2. The process of claim 1, wherein step (d.) may be eliminated by ensuring that said solution has, prior to step (d.), already formed a stable gel in said mold.

3. The process of claim 1, wherein a plurality of molds may be contained within said vessel.

4. A process for producing organic aerogels, said process comprising the steps of:
 (a.) forming a solution comprising a predetermined amount of organic aerogel precursor chemicals, a predetermined amount of polymerization promoting catalyst, and an organic solvent;
 (b.) adding said solution to a mold such that said mold is only partially filled with said solution;
 (c.) heating said mold sufficiently to cause said solution to form a stable gel;
 (d.) heating said mold to the point where said organic solvent of said solution is near to, at, or above supercritical conditions; and,
 (e.) venting said mold to extract said organic solvent from the pores of said gel.

5. The process of claim 4, wherein, prior to step (d.), said mold is pre-pressurized sufficiently to prevent boiling of said solution upon heating of said mold.

6. The process of claim 5, wherein a pressurized inert gas or a mixture of inert gases is used to pre-pressurize said mold.

7. A process for producing organic aerogels, said process comprising the steps of:
 (a.) forming a solution comprising a predetermined amount of organic aerogel precursor chemicals, a predetermined amount of polymerization promoting catalyst, and an organic solvent;
 (b.) containing said solution in a holding vessel which is fluidly connected with a mold;
 (c.) causing said solution to flow from said holding vessel through said fluid connection into said mold;
 (d.) heating said mold sufficiently to cause said solution to form a stable gel;
 (e.) heating said mold to the point where said organic solvent of said solution is near to, at, or above supercritical conditions; and,
 (f.) venting said mold to extract said organic solvent from the pores of said gel.

8. The process of claim 7, wherein said solution is formed within said holding vessel.

9. The process of claim 7, wherein said holding vessel is of a larger volume than said mold.

10. The process of claim 7, wherein said holding vessel supplies said solution to a plurality of molds.

11. The process of claim 7, wherein step (c.) occurs by application of pumping means to said solution.

12. The process of claim 7, wherein step (c.) occurs due to gravitational force.

13. The process of claim 7, wherein the internal pressure of said holding vessel is high relative to the internal pressure of said mold; and, step (c.) occurs due to the pressure differential between said holding vessel and said mold.

14. The process of claim 7, wherein said solution within said holding vessel is held at an elevated temperature relative to ambient conditions on the exterior of said holding vessel.

15. The process of claim 7, wherein, prior to step (c.), said mold is heated to a temperature that is elevated relative to ambient conditions.

16. The process of claim 7, wherein, throughout the entire said process, both said holding vessel and said mold are held at temperatures that are elevated relative to ambient conditions.

17. A process of forming organic aerogels comprising the steps of:
- (a.) forming a solution comprising a predetermined amount of organic aerogel precursor chemicals, and an organic solvent;
- (b.) containing said solution in a holding vessel which is fluidly connected with a mold;
- (c.) causing said solution to flow from said holding vessel through said fluid connection into said mold; and,
- (d.) approximately simultaneously with step (c.), mixing a predetermined amount of polymerization promoting catalyst with said solution flowing from said holding vessel into said mold;
- (e.) heating said mold sufficiently to cause said solution to form a stable gel;
- (f.) heating said mold to the point where said organic solvent of said solution is near to, at, or above supercritical conditions; and,
- (g.) venting said mold to extract said organic solvent from the pores of said gel.

18. A process for producing organic aerogels in a mold, said mold being at least partially contained within a substantially oxygen free region, and wherein the gaseous composition of said region surrounding said at least partially contained mold may be modified.

19. The process of claim 18, wherein said region comprises an inert gas or mixture of inert gases.

20. The process of claim 18, wherein said region is held at a pressure which is elevated relative to conditions on the exterior of said region.

21. The process of claim 18, wherein said region is substantially gas free.

22. The process of claim 18, wherein the aerogel formed in said mold is de-molded into said region.

23. A process for producing organic aerogels in a mold, said mold being at least partially contained within a substantially oxygen-free region, comprising the following production cycle:
- (a.) pressurizing said mold by filling said mold with an inert gas which is introduced from an external high-pressure source;
- (b.) partially or completely filling said mold with a solution of aerogel-forming chemicals in an organic solvent, said solution being introduced from an external source which is of a higher pressure than said inert-gas-filled mold;
- (c.) optionally re-capturing said inert gas in a high-pressure vessel as it is forced out of said mold by the introduction of said solution;
- (d.) heating said mold sufficiently to cause said solution to form a stable gel, and, thereafter, to cause said organic solvent to reach approximately supercritical conditions;
- (e.) venting said mold under approximately supercritical conditions in order to extract said organic solvent from the pores of said gel;
- (f.) optionally substantially removing the gaseous content of said mold; and,
- (g.) opening said mold and demolding finished aerogel product into said oxygen-free region, whereupon said mold may be re-closed and said process repeated for rapid production of organic aerogels.

* * * * *